(12) United States Patent
Pollock et al.

(10) Patent No.: US 8,970,146 B2
(45) Date of Patent: Mar. 3, 2015

(54) CONTROLLER FOR ELECTRICAL MACHINES

(75) Inventors: Charles Pollock, Oakham (GB); Helen Pollock, Oakham (GB)

(73) Assignee: Technelec Limited, Oakham (GB)

( * ) Notice: Subject to any disclaimer, the term of this patent is extended or adjusted under 35 U.S.C. 154(b) by 931 days.

(21) Appl. No.: 13/129,427

(22) PCT Filed: Nov. 17, 2009

(86) PCT No.: PCT/EP2009/065281
§ 371 (c)(1),
(2), (4) Date: Aug. 5, 2011

(87) PCT Pub. No.: WO2010/055168
PCT Pub. Date: May 20, 2010

(65) Prior Publication Data
US 2011/0285332 A1    Nov. 24, 2011

(30) Foreign Application Priority Data

Nov. 17, 2008  (GB) .................................. 0820895.1
Apr. 30, 2009  (GB) .................................. 0907454.3

(51) Int. Cl.
*H02P 21/00* (2006.01)
*H02P 6/18* (2006.01)
*H02P 21/14* (2006.01)

(52) U.S. Cl.
CPC .............. *H02P 6/18* (2013.01); *H02P 21/0039* (2013.01); *H02P 21/146* (2013.01)
USPC .................. 318/400.02; 318/400.01; 318/700

(58) Field of Classification Search
USPC ................ 318/400.01, 400.02, 700
See application file for complete search history.

(56) References Cited

U.S. PATENT DOCUMENTS

| 4,885,519 A | 12/1989 | Vogelmann |
| 5,428,283 A | 6/1995 | Kalman et al. |

(Continued)

FOREIGN PATENT DOCUMENTS

| EP | 1 657 808 A2 | 5/2006 |
| EP | 1 748 544 A2 | 1/2007 |

(Continued)

OTHER PUBLICATIONS

GB Search Report for corresponding British Application No. GB 0820895.1 dated Mar. 4, 2009.

(Continued)

*Primary Examiner* — Kawing Chan
(74) *Attorney, Agent, or Firm* — Renner, Otto, Boisselle & Sklar, LLP (57) ABSTRACT

The present invention relates to control of synchronous machines. A sensorless control system for an electrical machine is provided comprising a rotor and a stator having one or more phase windings for generating a rotating stator magnetic field. The current in the phase windings is monitored to determine real and imaginary components of the current vector in a rotating reference frame, from which real and imaginary components of the emf vector rotating in the rotating reference frame can also be determined. The ratio of the real and imaginary emf components is calculated, and an angular position of the rotational emf vector is estimated from this ratio. An angular error signal indicative of the deviation of the estimated angular position from a desired position in line with the real axis of the rotating reference frame is determined, and the machine is controlled such that the error signal tends towards zero.

12 Claims, 8 Drawing Sheets

(56) References Cited

U.S. PATENT DOCUMENTS

| | | | |
|---|---|---|---|
| 6,301,136 B1 | 10/2001 | Huggett et al. | |
| 6,850,031 B2* | 2/2005 | Nakata et al. | 318/801 |
| 6,910,389 B2 | 6/2005 | Ho | |
| 6,940,251 B1* | 9/2005 | Sarlioglu et al. | 318/721 |
| 7,075,264 B2* | 7/2006 | Huggett et al. | 318/400.02 |
| 7,193,383 B2* | 3/2007 | Sarlioglu et al. | 318/438 |
| 7,299,708 B2 | 11/2007 | Ho | |
| 7,855,526 B2* | 12/2010 | Ohnishi et al. | 318/800 |
| 2003/0080701 A1* | 5/2003 | Kikuchi et al. | 318/140 |
| 2004/0056487 A1* | 3/2004 | Sarlioqlu et al. | 290/52 |
| 2004/0257028 A1* | 12/2004 | Schulz et al. | 318/802 |
| 2005/0218862 A1* | 10/2005 | Huggett et al. | 318/722 |
| 2007/0007922 A1* | 1/2007 | Sarlioglu et al. | 318/438 |
| 2007/0040524 A1 | 2/2007 | Sarlioglu et al. | |
| 2007/0069681 A1* | 3/2007 | Imura et al. | 318/717 |
| 2007/0210767 A1* | 9/2007 | Mellor et al. | 323/237 |
| 2007/0236167 A1* | 10/2007 | Tomigashi | 318/721 |
| 2010/0001669 A1* | 1/2010 | Olomski | 318/400.06 |
| 2010/0097017 A1* | 4/2010 | Oteman et al. | 318/376 |
| 2010/0109584 A1* | 5/2010 | Kwon et al. | 318/400.02 |
| 2010/0207555 A1* | 8/2010 | Ide et al. | 318/400.02 |
| 2010/0283414 A1* | 11/2010 | Jun et al. | 318/400.02 |
| 2010/0315026 A1* | 12/2010 | De Four | 318/400.02 |
| 2010/0327789 A1* | 12/2010 | De Belie et al. | 318/400.33 |
| 2011/0241579 A1* | 10/2011 | Kimpara et al. | 318/400.02 |
| 2012/0306411 A1* | 12/2012 | Tadano | 318/400.02 |
| 2014/0084821 A1* | 3/2014 | Pollock et al. | 318/400.02 |

FOREIGN PATENT DOCUMENTS

| | | |
|---|---|---|
| EP | 1 852 967 A1 | 11/2007 |
| JP | 2006-230200 A | 8/2006 |

OTHER PUBLICATIONS

International Search Report for corresponding International Application No. PCT/EP2009/065281 mailed Jun. 21, 2010.

\* cited by examiner

CONTROLLER FOR ELECTRICAL MACHINES

The present invention relates to control of electrical machines and is concerned more particularly, though not exclusively, with control of synchronous machines such as hybrid stepping motors, flux switching machines, synchronous reluctance machines and brushless permanent magnet motors and generators.

In all synchronous motors and generators, it will be appreciated that the excitation current applied to the phase windings must be in synchronism with the rotor position to achieve smooth rotation of the rotor within the stator. More particularly, the excitation current applied to a phase winding must alternate in synchronism with the emf induced in each phase winding.

Under normal running conditions, the terminal voltage, $v_A$, across a phase of an electrical machine is given by:

$$v_A = e_A + i_A R_A + \frac{d(L_A i_A)}{dt} + \frac{d(M_{AB} i_B)}{dt} + \frac{d(M_{AC} i_C)}{dt}$$

which can be approximated to $$v_A = e_A + L_A \frac{di_A}{dt} + i_A R_A + M_{AB} \frac{di_B}{dt} + M_{AC} \frac{di_C}{dt} \quad (1)$$

where the subscripts A, B and C denote the first, second and subsequent (if present) phase windings respectively, $L_A$ is the self inductance of phase winding A, $i_A$, $i_B$ and $i_C$ are the currents in A, B and subsequent phase windings respectively, $R_A$ is the resistance of phase winding A, $M_{Ax}$ is the mutual inductance between the first and subsequent (x th) phase windings and $e_A$ is the rotational emf induced in the phase winding due to rotation. The rotational emf may be caused (i) by variation in the flux linkage from magnets on the rotor passing the stator coils (permanent magnet synchronous machine) or (ii) by variation in the self and/or mutual inductance of one or more stator windings as the reluctance of the rotor varies with rotation (synchronous reluctance machine) or (iii) by variation in flux linkage between a stationary field winding and the armature windings as a variable reluctance rotor turns (flux switching machine).

It is beneficial for the control of synchronous reluctance, synchronous permanent magnet, flux switching and stepping motors to be achieved without position sensors. In theory the rotor position information can be found if the rotational emf term in each phase winding ($e_A$) can be electronically separated from the other terms in equation (1). In a practical sensorless estimator scheme, this process is complicated by the fact that the inductance L of a phase winding depends in a non-linear manner on the current i flowing through the phase winding and also depends on rotor position and furthermore by the fact that the resistance R of the phase winding depends upon the temperature. Furthermore the resistance R can be changed dramatically if a motor is connected to a controller using a long cable or operates over a range of temperature. In some motors the mutual inductance, M, between phase windings, is negligible and can be ignored. In synchronous reluctance motors there are significant variations in self inductance and mutual inductance making sensorless methods based on motor models difficult to implement.

Previous sensorless estimator schemes have either ignored the dependence of phase inductance L on current i, resulting in significant errors, or have required the use of a machine-specific model which describes the non-linear characteristics of a motor core, resulting in a computationally intensive implementation and also a lengthy drive commissioning process.

In three phase permanent magnet synchronous motors it is common to estimate the position of the rotor by monitoring the rotational emf in one of the phase windings which is not carrying any current during part of the excitation cycle. However for quiet operation it is preferable to use a more sinusoidal excitation scheme where current flows in all three phases of the machine, throughout the electrical cycle. Simple back-emf sensing is not then possible and researchers have sought ways to control such motors without the use of mechanical sensors.

U.S. Pat. No. 6,910,389 and U.S. Pat. No. 7,299,708 use a flux estimator to provide a first estimate of position and uses reactive power to provide a correcting second estimate of position. Such flux estimators involve accurate integration of voltage and require extremely accurate estimation of resistive voltage drops as any error is accumulated by the integrator.

U.S. Pat. No. 5,428,283 uses Park Vectors to determine and control the reactive power and hence the power factor of the machine. Operation at a pre-determined power factor can control the rotor position with respect to the stator excitation. However, such schemes are complex to set up if they are to operate over a wide range of speed and load.

U.S. Pat. No. 6,850,031 describes a method for the control of the motor without sensors in which the reactive current is obtained from the motor current and a rotation phase, an error voltage is obtained from the reactive current and the command value of the reactive current, thereby obtaining the voltage control values for the motor windings. The limitation in this scheme is that the command value for the reactive current needs to be established and may in some motors be difficult to predict. This method is particularly limited in motors with higher inductance and in motors where there is a significant variation in self inductance or mutual inductance with position.

U.S. Pat. No. 6,301,136 describes a floating frame controller method for control of quadrature current (i.e. imaginary current vector) to a pre-determined value (eg zero) by adjustment of the reference frame position (voltage vector position). This method maintains the current at a known angle relative to the voltage but does not control the position of the excitation relative to the rotor.

U.S. Pat. No. 7,075,264 discloses an Instantaneous Power Floating Frame Controller for a synchronous machine. Calculation of real and reactive power gives a power factor angle. The motor is controlled to maintain the power factor angle close to zero. Application of this method is computationally complex. The estimated position is the result of two integral controllers delaying its response.

Application US 2007/0040524 further describes a method for the control of the power factor of a synchronous machine to values other than unity using the synchronous and floating reference frame ideas.

None of these prior art documents describes a method for the control of all types of synchronous motor or generator without the use of sensors in which the method is not dependent on highly accurate measurements or accurate motor models.

It is an object of the invention to provide a sensorless control scheme for an electrical machine which can be effected in a straightforward manner and which can be used with a wide range of motors and generators.

According to the present invention there is provided a control system for an electrical machine comprising a rotor and a stator having one or more phase windings for generating a rotating stator magnetic field in a stationary reference frame relative to the stator, the system comprising detection means for monitoring current in at least one of the phase windings, first calculating means for determining from the monitored current a value representative of at least one component ($I_{s\_real}$, $I_{s\_imag}$) of the current vector in a rotating reference frame rotating relative to the stationary reference frame, second calculating means for determining from the monitored current a value representative of at least one component ($E_{s\_real}$, $E_{s\_imag}$) of the emf vector rotating in the rotating reference frame, estimating means for estimating a value representative of an angular position of the rotating emf vector from said value representative of at least one component ($E_{s\_real}$, $E_{s\_imag}$), error means for determining an angular error signal indicative of the deviation of the estimated angular position from a desired angular position, and synchronising means for controlling the machine such that the angular error signal tends towards zero.

Unlike the aforementioned prior art this invention provides a sensorless control scheme which is mathematically very simple to implement and can therefore be implemented within every pulse width modulation cycle of an inverter to maintain synchronism with the rotor with high bandwidth and can be operated over a wide speed range to control motors and generators of all types without being dependent on a detailed model of the machine's inductance, resistance and emf characteristics. The method according to this invention is particularly effective at elimination of measurement errors making it suitable for implementation at lower cost.

One embodiment of the invention may include a control system wherein the estimating means comprises a step of determining the ratio of the orthogonal components of the rotational emf.

One embodiment of the invention may include a control system wherein the estimating means comprises a step of determining the ratio of the orthogonal components of the current.

One embodiment of the invention may include a control system wherein the estimating means estimates the angular difference between the angle of the current vector and the angle of the rotational emf vector by evaluating the difference between the ratio of the orthogonal current vectors and the ratio of the orthogonal emf vectors. The error means calculates the error between the estimate of the angular difference and the desired angular difference and uses this error in the synchronising means to control the position of the voltage vector to minimise the error.

In a second embodiment a control system for an electrical machine comprising a rotor, a stator having one or more phase windings for generating a rotating stator magnetic field, the system comprising detection means monitoring current in at least one of the phase windings providing a real component ($I_{s\_real}$) along a real axis at a known angle in line with a rotating reference frame and an imaginary component ($I_{s\_imag}$) orthogonal to the real component ($I_{s\_real}$), calculating means for determining a value of the real component ($E_{s\_real}$) of the rotational emf along an axis at a known angle in line with a rotating reference frame and an imaginary component ($E_{s\_imag}$) orthogonal to the real component ($E_{s\_real}$), estimating means for estimating an angular position of the rotational emf vector using at least one of the estimated orthogonal components of the emf, error means for determining an angular error signal indicative of the deviation of the estimated angular position from a desired position, the error means further determining the real current error between the real current vector Is_real and a target value for the real current vector and determining the imaginary current error between the imaginary current vector Is_imag and a target value for the imaginary current vector, controlling means wherein a real voltage vector, Vs_real, is determined which minimises the real current error and an imaginary voltage vector, Vs_imag, is determined which minimises the imaginary current error, and synchronising means which simultaneously uses the error between the estimated angular position of the emf vector and the desired angular position of the emf vector to correct the angular position of the rotating reference frame and deliver the real voltage vector, Vs_real, and the imaginary voltage vector, Vs_imag, determined by the controlling means in line with the corrected angular position of the rotating reference frame.

In order that the invention may be more fully understood reference will now be made, by way of example, to the accompanying drawings, in which.

Application of the invention will be described with reference to motoring operation. However the method of the invention can be applied to a generator where the phase relationship between the current vector and the emf vector will be inverted.

As is common in the treatment of electrical machines it is common to analyse the machine totally in electrical cycles and electrical degrees. When this is done the analysis presented here is then identical for all synchronous machines of any type and pole numbers. In such analysis it is common to transform the statically orientated, time varying sinusoidal quantities of each stator winding into a single system of rotating vectors, rotating at the same speed as the average speed of the rotor.

Whilst the mathematics used to describe the systems according to this invention assume sinusoidal quantities, the operation of the systems can be implemented in real time without sinusoidal current and voltage waveforms. In fact the voltage and current waveforms in an electric motor are rarely perfect sinusoids. Accordingly the techniques described for implementing this invention are completely valid.

Figure 1:
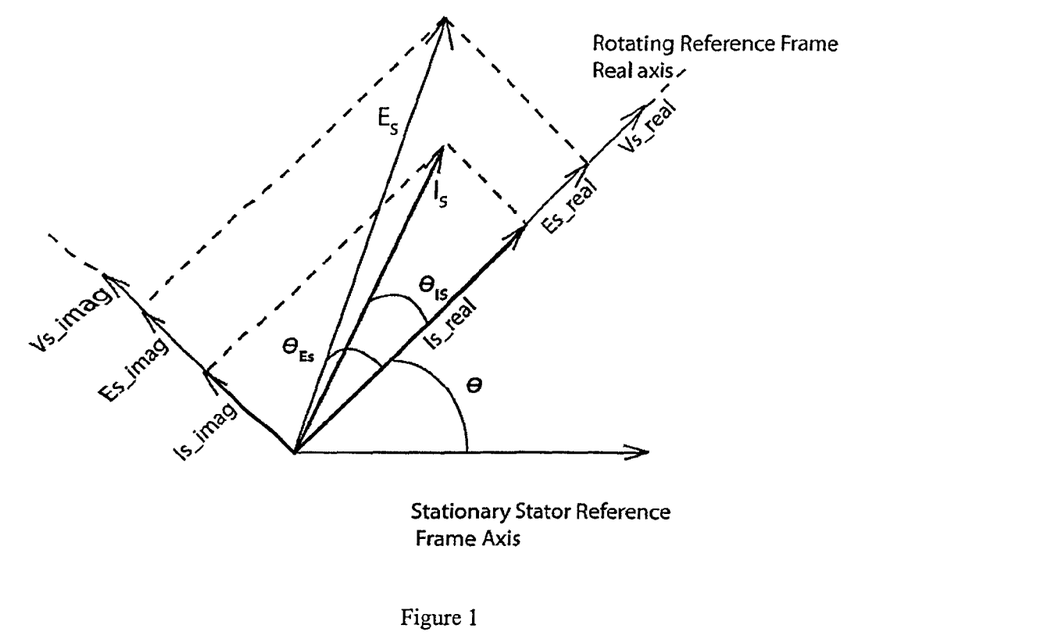
FIG. 1 shows a vector diagram in the stator rotating reference frame.

FIG. 1 shows the stator voltage vector, V, comprising a real component, Vs_real in line with the real axis of a rotating stator reference frame and an imaginary component, Vs_imag orthogonal to the real axis. The real axis of the stator rotating reference frame is positioned at an angle, θ, to the stator's stationary reference frame.

The rate of increase of the angle, θ, determines the angular rotational velocity of the stator field. One revolution of the vector in the stator stationary reference frame corresponds to one electrical cycle of the machine. In a machine with p magnetic rotor poles there are p/2 electrical cycles per mechanical revolution of the stator.

Figure 2:
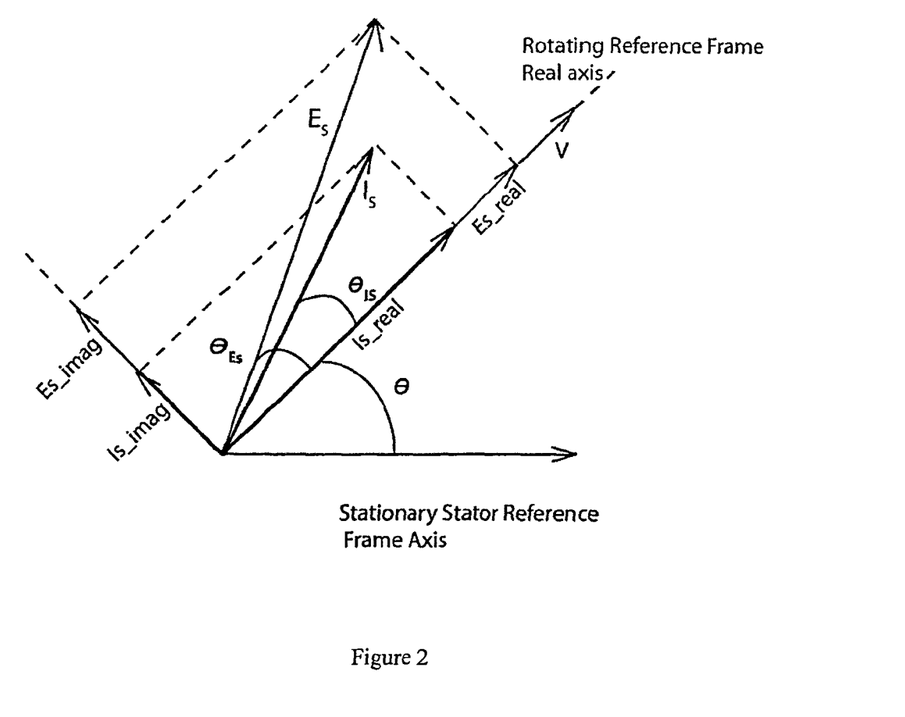
FIG. 2 shows a further vector diagram in the stator rotating reference frame.

In one embodiment of the invention, illustrated by the vector diagram in FIG. 2, it is convenient to choose the position of the stator rotating reference frame to be coincident with the position of the stator voltage vector as this is a known and controlled parameter. During normal rotation of the motor the stator voltage applied to the phase windings of the motor can be thought of as having a single component which acts at a variable angle, θ. In this example the stator voltage vector, V, will be considered as an anti-clockwise rotating vector such that the angle, θ, increases with time. The single voltage vector in the stator rotating reference frame is applied to the motor phase windings as variable voltage vectors through a multiphase inverter or power control means. The power control means uses pulse width modulation in the inverter switches to apply the desired voltage to each phase winding.

As a result of the application of the stator voltages by the power control means phase currents flow in the phase windings of the motor to and from the power control means. The time varying stator currents create a rotating stator current vector, $I_S$. The components of this vector on a rotating stator reference frame can be calculated from time varying phase currents, for example, by the Park Transformation.

The rotational emf vector $\overline{E_s}$ is the combination of the rotational emf in the phase windings mapped onto the rotating stator reference frame. The rotational emf may include components from the rotation of magnets in permanent magnet motors or through the variation in reluctance in rotor designs containing a variable reluctance structure. In synchronous reluctance motors the variation in reluctance as the rotor rotates leads to variations in self inductance of each phase winding and variations in mutual inductance between windings. The rotational emf according to this invention can therefore be any time varying combination of changing fluxes, due to a phase winding's own current (self inductance), the currents in other windings (mutual inductance) or a rotating permanent magnet. In certain interior permanent magnet motors the rotational emf will comprise components from variations in both permanent magnet flux and reluctance as the rotor rotates. In the flux switching motor the rotational emf is induced by the rate of change of mutual coupling with a stationary field winding. FIGS. 1 and 2 show the relationship between the vector $\overline{E_s}$ and the stator current vector, $\overline{I_s}$.

The torque produced by the motor is given by $$T = \frac{\overline{I_s} * \overline{E_s} \cos(\gamma)}{\omega} \quad (2)$$

where

γ is the angle between the rotational emf vector and the stator current;

ω is the rotational velocity of the rotor in mechanical radians per second.

Operation of the motor with maximum torque per ampere is achieved if γ=0 and the $\overline{E_s}$ and $\overline{I_s}$ vectors are coincident. When, γ=0, the rotational emf vector $\overline{E_s}$ is in phase with the stator current vector and the torque is again given by equation (2) which is now maximum and equal to.

$$T = \frac{\overline{I_s} * \overline{E_s}}{\omega} \quad (3)$$

The angular position of the emf vector with respect to the stator current vector therefore determines the torque production of the motor.

Figure 3:
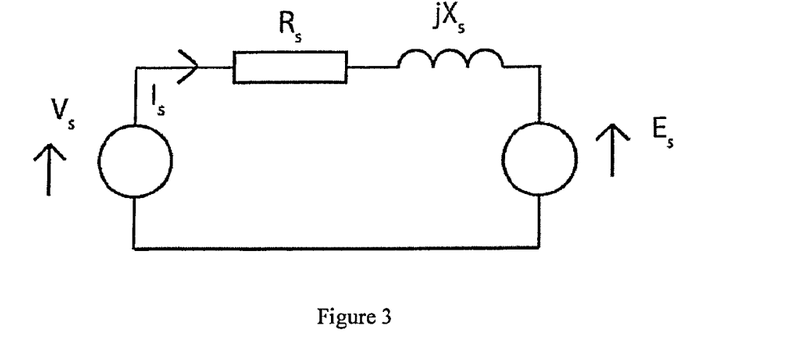
FIG. 3 shows an equivalent circuit of a machine according to the invention in the stator rotating reference frame.

Using the electrical quantities on the stator reference frame containing components of all the phase windings of the motor an equivalent circuit of the stator reference frame is shown in FIG. 3. The stator voltage equation, in the stator reference frame, of each phase is given by:

$$\overline{V_s} = \overline{E_s} + j\overline{I_s} X_s + \overline{I_s} R_s \quad (4)$$

Where $\overline{V_s}$, $\overline{E_s}$, $\overline{I_s}$ are the vector quantities of the stator voltage, rotational emf and stator current with respect to the rotating stator reference frame; $X_s$ is the reactance of the stator phase winding and $R_s$ is the resistance of the stator phase windings. $X_s$ may also be a complex variable with different components in the real and imaginary axes. This is common in motors with significant variation in reluctance (and hence stator inductance) as the rotor rotates. An example of such a motor where reactance $X_s$ could have different components in the real and imaginary axes would be an interior permanent magnet synchronous motor or a synchronous reluctance motor.

Control of a machine according to the invention can be achieved without using any magnetic flux estimation by simple calculation of a value indicative of the angular positions of the $\overline{E_s}$ and $\overline{I_s}$ vectors relative to a rotating reference frame, determining one or more error signals indicative of the deviation of the angular positions from desired positions, and controlling the modulation of the switches in the power control means to control the motor such that the error signals tend towards zero.

At any point in time the instantaneous phase currents in a motor can be measured. If it is a three phase motor, only two of the three phase currents need be measured since it is known that the sum of the three phase currents add to zero. A three phase to two phase Clark transformation can be used before the two phase stationary currents are transformed into a rotating stator reference frame at angle, θ, using, for example, the Park transformation. The two quadrature components of the stator current vector $\overline{I_s}$ in the rotating stator reference frame are $I_{s\_real}$ and $I_{s\_imag}$. The component $I_{s\_real}$ is the effective component of the stator current in line with the rotating stator reference frame, and $I_{s\_imag}$ is the effective component of the stator current at right angles (orthogonal) to the rotating stator reference frame. These quadrature vectors are shown in FIG. 2.

The terms direct and quadrature axes are not used in this description to avoid confusion with rotor orientated controllers which require the stator currents to be mapped onto the direct and quadrature rotor axes.

Since $\overline{V_s}$, $\overline{E_s}$, $\overline{I_s}$ all have real and imaginary parts, equation (4) can be rewritten into a real part and an imaginary part:

$$V_{s\_real} = E_{s\_real} + I_{s\_real} * R_s - I_{s\_imag} * X_s \quad (5)$$

$$\text{and, } V_{s\_imag} = E_{s\_imag} + I_{s\_imag} * R_s + I_{s\_real} * X_s \quad (6)$$

As described earlier the values of $X_s$ in equations (5) and (6) may not be identical if a motor such as a synchronous reluctance motor or interior permanent magnet motor is used where the stator inductance may be different in real and quadrature axes.

If, as shown in FIG. 2, the rotating reference frame is chosen to be coincident with the stator voltage vector, V, then the imaginary component of the stator voltage will be zero and equations (5) and (6) become $$V = E_{s\_real} + I_{s\_real} * R_s - I_{s\_imag} * X_s \tag{7}$$

$$0 = E_{s\_imag} + I_{s\_imag} * R_s + I_{s\_real} * X_s \tag{8}$$

These equations can be rearranged to give equations for the real and imaginary components of the emf vector, $\overline{E_s}$, $$E_{s\_real} = V - I_{s\_real} * R_s + I_{s\_imag} * X_s \tag{7}$$

$$E_{s\_imag} = -I_{s\_imag} * R_s - I_{s\_real} * X_s \tag{8}$$

Given suitable values for $R_s$ and $X_s$ and knowing the magnitude of the voltage vector delivered through the inverter, these equations can be evaluated in real time during rotation of the motor to give the real and imaginary components of the rotational emf vector in the rotating reference frame. The magnitude of the voltage vector can either be estimated from the commanded pulse width modulation duty cycles in the inverter or be monitored at the outputs of the inverter.

The angle of the current vector relative to the stator reference frame can now be calculated and is given by $$\theta_{Is} = \tan^{-1}\left(\frac{I_{s\_imag}}{I_{s\_real}}\right). \tag{9}$$

The angle of the emf vector relative to the stator reference frame can also be calculated and is given by $$\theta_{Es} = \tan^{-1}\left(\frac{E_{s\_imag}}{E_{s\_real}}\right). \tag{10}$$

The angular difference, $\theta$, between the current vector and the emf vector is therefore given by $$\theta = \theta_{Is} - \theta_{Es} = \tan^{-1}\frac{I_{s\_imag}}{I_{s\_real}} - \tan^{-1}\frac{E_{s\_imag}}{E_{s\_real}}. \tag{11}$$

For small angles this can be approximated to $$\theta = \theta_{Is} - \theta_{Es} \approx \frac{I_{s\_imag}}{I_{s\_real}} - \frac{E_{s\_imag}}{E_{s\_real}}. \tag{12}$$

Equation 12 is a simple calculation of a value indicative of the angular difference between the $\overline{I_s}$ and $\overline{E_s}$ vectors and can be implemented easily in a digital or analogue controller to operate in real time as the motor rotates.

The advantage of implementing the angular difference calculation in the form of equation 11 or 12 is that the ratio quantities provide cancellation of absolute values of the emfs and the currents. This makes the method substantially independent of the variation in the magnitude of emf with speed and/or field current and avoids the need for the position controller to have detailed knowledge of the motor's emf characteristic.

Using the ratio terms in the equations (11) and (12) also help to cancel out measurement and scaling errors in the current measurements since both the real and imaginary components will contain similar errors which are cancelled. This reduces the cost of the measurement system allowing the controller to be implemented at lower cost using simple electronic components. One major advantage of this invention is that the implementation of equation (12) can be achieved with lower computational requirements than equation (11) with no significant penalty.

The angular error is the error between the measured angular difference calculated from Equation (12) or (11) and a particular desired value for the angular difference. For example, for maximum torque per ampere, it would be desired to have no angular difference between the current vector and the emf vector so that they were completely in phase. However, at high speeds it is common in electrical motor control to advance the voltage vector to pull the current vector ahead of the emf vector to achieve field weakening. In this case, under high speed conditions, it could be desirable to have a positive angular difference as calculated by equations (11) or (12) and so the desired value for the angular difference would be positive.

An angular error is therefore given by $$\text{Angular\_error} = \text{Angular\_demand} - (\theta_{Is} - \theta_{Es}) \tag{13}.$$

An angular error calculated by equation (13) can be corrected by moving the voltage vector to a new position which tends to reduce the angular error. A positive angular error means that the position of the voltage vector needs to be moved further than the normal angular increment calculated from its average rotational velocity in order to correct the error. A negative angular error means that the position of the voltage vector needs to be moved by less than the normal angular increment calculated from its average rotational velocity in order to correct the error. A control scheme which achieves this could use a proportional plus integral controller on the angular error to deliver instantaneous control of the angular velocity of the voltage vector.

The invention can also be applied using a vector cross product of the $\overline{E_s}$ and $\overline{I_s}$ vectors to evaluate the sin of the angle between the vectors.

$$\overline{E_s} \times \overline{I_s} = |E_s||I_s|\sin\theta = \begin{vmatrix} i & j & k \\ E_{s\_real} & E_{s\_imag} & 0 \\ I_{s\_real} & I_{s\_imag} & 0 \end{vmatrix} \tag{14}$$

$$\sin\theta = \frac{E_{s\_real} * I_{s\_imag} - E_{s\_imag} * I_{s\_real}}{|E_s||I_s|}$$

which for small angles where $I_{s\_imag}$ and $E_{s\_imag}$ are small compared to $I_{s\_real}$ and $E_{s\_real}$ approximates to the same equation as (12).

Control of a synchronous machine according to one embodiment of this invention can therefore be implemented by the Equation (12) and error equation (13). Whilst Equation (12) is an approximation to the actual mathematical equation for the angles it has been found to work even when the angles are large and the approximations are less accurate. This is because, whilst the approximation in equation (12) is a linear function representative of the inverse tan function it always represents the correct gradient of the tan function and as a result the error calculated by Equation (13) always has the right sign. Since the controller involves the integration of this error, to produce the angular velocity of the voltage vector, the controller will converge on the correct operating point. The speed of response can be controlled using the gains of the proportional and integral control loops. The gains of the control loop can also be non-linear to create a closer approximation to the inverse tan function, though practical experience has shown that this is not always necessary.

Maintaining equation (13) close to zero will hold the motor near to ideal operation at all times by allowing the angular velocity of the voltage vector to change instantaneously in each evaluation of the control loop. The average angular velocity of the voltage vector is directly related to the integral of the angular error. An outer control loop could monitor the average angular velocity of the voltage vector and increase or decrease the length of the voltage vector, increasing or decreasing the current in the motor, to increase or decrease the torque output to bring the rotational velocity of the voltage vector closer to a required angular velocity of the motor. This is illustrated in FIG. 4.

Unlike other sensorless control methods which rely on estimating the emf in the motor accurately, the method according to this invention can be implemented without exact values for the motor parameters in Equation (7) and (8) i.e. Rs and Xs, since small errors are eliminated by the ratio of the two emf components. The error in the component values needs to be quite significant before changes in the sign of the error will occur, thus keeping the controller very stable despite the approximations used in its method. This robustness makes the method according to this invention very tolerant to parameter variations.

Figure 4:
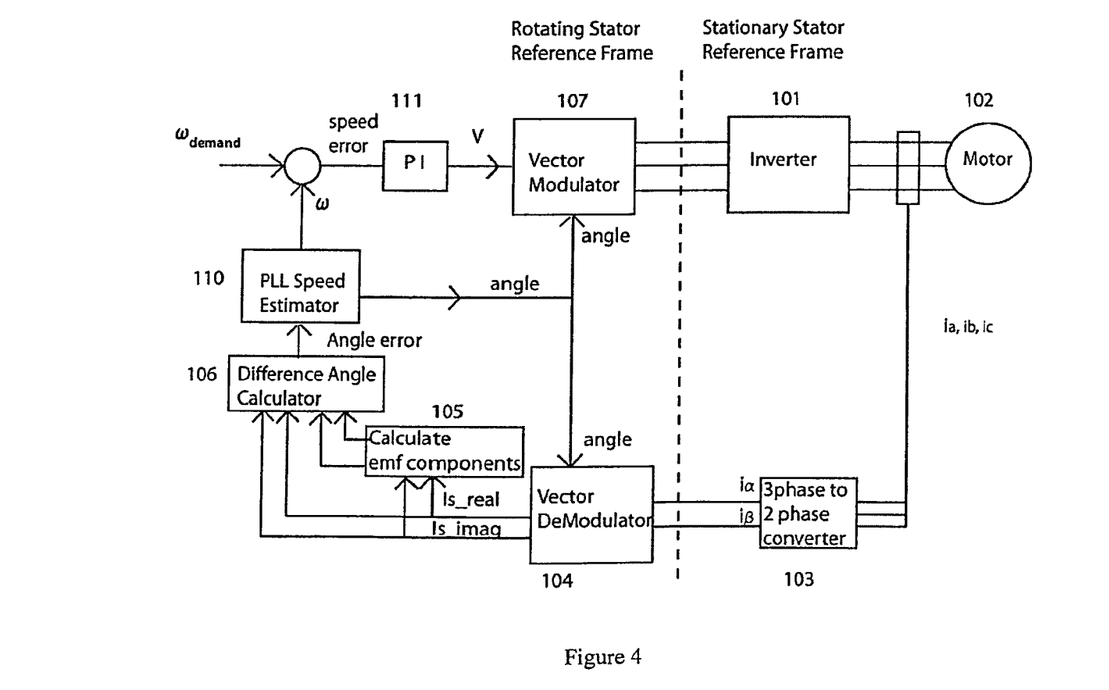
FIG. 4 shows a block diagram of a machine controller according to one embodiment of the invention.

One embodiment of the invention is illustrated by the block diagram in FIG. 4 which uses the angular error calculated in each iteration of the control loop to set the instantaneous speed of rotation of the voltage vector up to the next calculation time. An outer control loop will determine the voltage vector magnitude. A power electronic inverter 101 and motor or generator 102 is controlled according to this aspect of the invention. The currents to/from the motor 102 are monitored (detection means) at a pre-determined interval of time or rotor angle. Three phase currents can be transformed to two phase currents in the stationary stator reference frame by block 103. If the motor is a two phase motor such as a hybrid stepping motor this step 103 is not necessary.

A vector demodulation block 104 (calculating means) transforms the currents from the stationary stator reference frame to the rotating stator reference frame at a known angle to produce the real current vector $I_{s\_real}$ aligned with the rotating stator reference frame and the imaginary current vector $I_{s\_imag}$ orthogonal to the rotating stator reference frame. These currents are used by the EMF Component Estimator 105 and angle calculator 106 (estimating means) which implements equation 12 to estimate an angular position of the emf vector relative to the current vector. An error means uses equation 13 to calculate an angular error of the deviation of the angular position relative to a desired position. To correct the angular error the synchronising means repositions the voltage vector to bring the current vector to the correct position with respect to the emf vector to deliver the required control angle at the next time step. As part of the synchronising means, the angular error term is passed to a controller 110 which may have proportional and integral controllers to generate an updated rotational speed and new angular position for the voltage vector modulator 107 which will tend to reduce the angular error for the present speed and load. The integration of an angular error to produce average speed with instantaneous correction of the next angular position is similar to a phase locked loop. The speed estimate from block 110 is compared to the speed required by the user demand to produce a speed error. The speed error may pass through a further PI controller 111 to recalculate the magnitude of the next voltage vector which is passed to the vector modulator 107. The voltage vector and its new angular position relative to the stationary stator reference frame serve to drive the inverter 101 and motor 102 during the next time step.

In this embodiment the speed control loop to set the voltage vector magnitude can be thought of as an outer control loop and would typically have a longer time constant than the angle control loop driven by the angular error according to the invention. In this way rapid resynchronisation of the stator voltage vector is possible in response to the angular error. This will result in minor fluctuations of the stator vector rotational speed (which is following the actual rotor speed) which are corrected by increasing or decreasing the voltage vector magnitude in the outer control loop.

A second embodiment of the invention uses a simple modification of the method to further simplify the calculations. Referring again to FIG. 1, the rotating reference frame is again chosen to be the real axis of the rotating reference frame at an angle θ, to the stator's stationary reference frame, but in this embodiment the stator voltage is assumed to have both a real component $V_{s\_real}$ and an imaginary component $V_{s\_imag}$ (the imaginary component of the voltage is no longer assumed to be zero). The voltage equations in the real and imaginary axes are as given in equations (5) and (6). These equations can be rearranged to give equations for the real (in line with the rotating reference frame) and imaginary (orthogonal to the rotating reference frame) components of the emf vector, $\overline{E}_s$, $$E_{s\_real} = V_{s\_real} - I_{s\_real} * R_s + I_{s\_imag} * X_s \quad (15)$$

$$E_{s\_imag} = V_{s\_imag} - I_{s\_imag} * R_s - I_{s\_real} * X_s \quad (16)$$

Given suitable values for $R_s$ and $X_s$ (which may have complex components) and using $V_{s\_real}$ and $V_{s\_imag}$ as applied by the inverter, these equations can be evaluated in real time during rotation of the motor to give the real and imaginary components of the rotational emf vector in the rotating reference frame.

In this second embodiment the angle of the current vector and the angle of the emf vector are determined and controlled in two separate control loops.

Firstly, it is useful to set target values for the real and imaginary components of the current vector. Two axis current controllers are well known in the art. Given target values for the real and imaginary current vectors, real and imaginary voltage vectors can be calculated which will minimise the deviation in the measured real and imaginary current vectors from the target values. In most cases the target value for the imaginary current vector will be close to zero, whereas the target value for the real current vector will be set by the torque requirement of the motor or generator. The torque requirement may in turn be set by a speed error signal which will determine the torque required to maintain a target speed.

At high speeds, (as explained previously), it is common in electrical motor control to advance the current vector ahead of the emf vector to achieve field weakening. In this embodiment this is achieved by setting the imaginary current target to a positive value, though in most practical cases the imaginary current target will be smaller than the real, torque producing, current target.

In a machine operating as a generator the value of the real current target will be negative such that the real current vector should be 180° away from the positive real axis.

In this embodiment, the angle of the current vector relative to the rotating reference frame is fixed by the real and imaginary current demands, provided that the bandwidth and magnitudes of the real and imaginary voltages are sufficient to minimise the current error signals. The step of calculating a current angle as given in equation (9) is therefore not necessary as part of this second embodiment.

The angle of the emf vector relative to the real axis rotating reference frame can be calculated in the same way as the first embodiment using equation (10) or more simply by $$\theta_{Es} \approx \left(\frac{E_{s\_imag}}{E_{s\_real}}\right). \quad (17)$$

Equation 17 is a simple calculation of a value indicative of the angular position of the $\overline{E_s}$ vector relative to the real axis of the rotating reference frame. In this embodiment since the current has already been controlled to be predominantly in phase with the real axis, or at a chosen advance angle, the optimum operation of the machine can be achieved by controlling the inverter voltage to reduce the angle calculated by equation (10) or (17) to zero to bring the emf vector into line with the real axis of the rotating reference frame. This can be implemented easily in a digital or analogue controller to operate in real time as the machine rotates. One controller implementation would modify the angular speed of the rotating reference frame to minimise the angle calculated by equation (10) or (17). Since the purpose of this part of the controller is to bring equation (10) or (17) to zero, and since a target angle of zero can have no scaling errors or parameter variations, the method is extremely stable against variations in motor parameters.

Since $I_{s\_real}$ is greater than $I_{s\_imag}$ the resistive term in $E_{s\_imag}$, calculated by equation 16 is small. $E_{s\_imag}$ is substantially independent of temperature. The $E_{s\_real}$ term calculated by (15) does contain a significant resistive term. However, in most motors and generators this will be smaller that the other voltage terms in equation 15. Whilst the estimation of $E_{s\_real}$ does depend on temperature the impact on the method according to the invention is effectively a small change in the gain of the angle controller which does not affect its performance. This is in complete contrast to all prior art methods relying on flux estimation since the integration of terminal voltages to calculate flux is very dependent on accurate resistance values. This invention is therefore a major breakthrough in the control of motors with significant resistance variation with either temperature or cable lengths.

In some implementations of the invention the calculation of $E_{s\_real}$ can be simplified rather than using the equation (15). In the hybrid stepping motor or a permanent magnet synchronous motor the emf is due to the rotation of the magnetic rotor and the real emf, $E_{s\_real}$ can be simplified to being a function of rotor speed, $E_{s\_real}$=f(Speed). For a permanent magnet motor or hybrid stepping motor equation (17) can be changed to:

$$\theta_{Es} \approx \frac{E_{s\_imag}}{f(\text{Speed})}, \quad (18)$$

where f(Speed) normalises the emf angle estimator against variations in the magnitude of the emf with speed.

In a flux switching motor it is known that the rotational emf is proportional to both field current and speed so that $E_{s\_real}$ can be simplified to a function related to the product of speed and field current.

In some implementations of this embodiment it is possible to further simplify equation (17) to avoid the need for any calculation of, or division by, $E_{s\_real}$. Equation (17) is then further simplified to (19), $$\theta_{Es} \approx k^* E_{s\_imag} \quad (19)$$

where k is a scaling factor or gain. The scaling factor or gain may be a function of any of the controller parameters or can be adjusted by any of the methods known in the art for stabilisation of control loops.

One example where this simplification would be appropriate would be in the flux switching machine. In such a machine the magnitude of the emf is determined by both speed and by field current. Operation at high speed often is associated with lower field current to achieve field weakening and as a result the variation in the magnitude of the emf across the operating range of the motor may not be so significant (compared to a permanent magnet machine where the emf always increases with speed). Using this simple equation (19) shows that the control of the angle of the emf is achieved by minimising the magnitude of the imaginary component of the emf without needing to calculate the real emf. Since the field weakening in the flux switching machine can be achieved with field current, there is a reduced requirement to advance the current vector. The resistive term in the calculation of the imaginary emf using equation (16) is therefore very small which makes the whole method substantially independent of winding resistance and therefore very stable over a wide range of motor temperatures without any requirement for compensation.

If $\theta_{Es}$ is positive then the emf vector can be considered to be ahead of the reference frame position and an error term can be used in conjunction with, for example, a PI controller to calculate a new higher angular speed for the rotating reference frame to minimise the angle calculated by equation (10), (17), (18) or (19). This would occur in an accelerating motor where the torque of the motor is larger than the torque of the load and the rotor is accelerating ahead of the rotating reference frame.

If $\theta_{Es}$ is negative then the emf vector can be considered to be behind the reference frame position and an error term can be used in conjunction with, for example, a PI controller to calculate a new higher angular speed for the rotating reference frame to minimise the angle calculated by equation (10), (17), (18) or (19). This would occur in a motor where the torque of the motor is smaller than the torque of the load and the rotor is decelerating causing the emf to lag behind the rotating reference frame. Correction of the velocity of the rotating reference frame will keep the motor running at the ideal operating point.

The advantage of implementing the angular calculation in the form of equation (10), (17) or 18 is that the ratio quantity provides cancellation of absolute values of the emf components. This makes the method completely independent of the variation in the magnitude of emf with speed and/or field current and avoids the need for the position controller to have detailed knowledge of the motor's emf characteristic. It also avoids the need to have significant changes in the gain of the angle controller with speed, simplifying its implementation, shortening the calculation loops and allowing the system according to the invention to be implemented with very high bandwidth.

Figure 5:
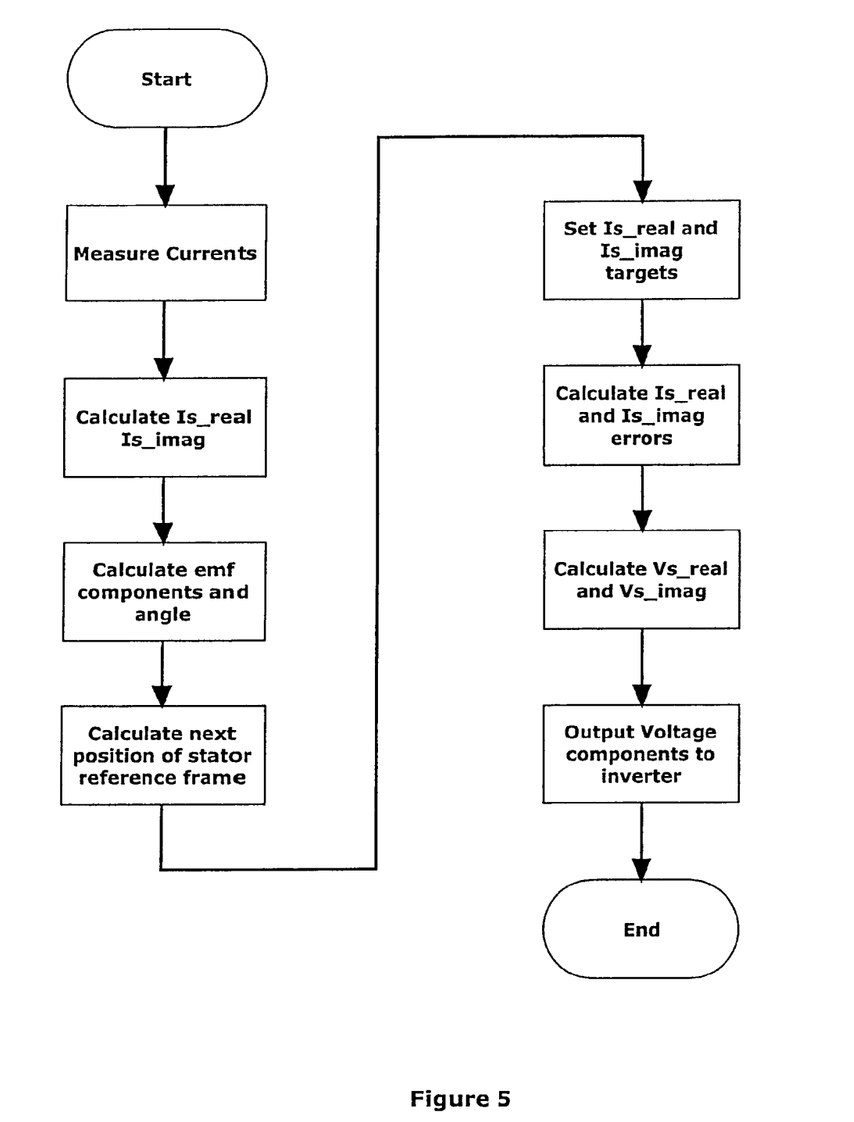
FIG. 5 shows a flow chart of a calculation procedure according to one embodiment of the invention.

The simple implementation of this second embodiment is illustrated using the flow chart of FIG. 5.
  (i) The currents in the motor or generator are measured and the real and imaginary components of the current vector are calculated.
  (ii) The real and imaginary emf vector components are then calculated using equations (15) and (16).
  (iii) The next position of the rotating stator reference frame is calculated to minimise the angular position of the emf vector relative to the real axis of the rotating stator reference frame.

(iv) The target values for the real and imaginary current vectors are set. The next position of the rotating stator reference frame may be ahead or behind a desired position or may be moving faster or slower than a desired speed and this information may be used to set target values for the real and imaginary current vector components.

(v) The errors between the real and imaginary currents and the target values are calculated.

(vi) Current control loops in the real and imaginary axes determine the real and imaginary voltage vectors which will minimise the current errors in each axis.

(vii) The real and imaginary voltage vectors are output to the inverter at the new position of the rotating stator reference frame using a vector modulator. This step simultaneously corrects the voltage magnitude to reduce the real and imaginary current errors and the next position of the rotating stator reference frame is moved to minimise the deviation of the angular position of the emf vector relative to the next position of the real axis of the rotating stator reference frame.

Since the steps of implementation of this invention are so simple without the requirement of a complex motor model, the steps illustrated by FIG. 5 can be implemented very quickly in a low cost microcontroller. Implementation of this invention provides an extremely robust, simple and low cost machine control system with a high bandwidth.

Figure 6:
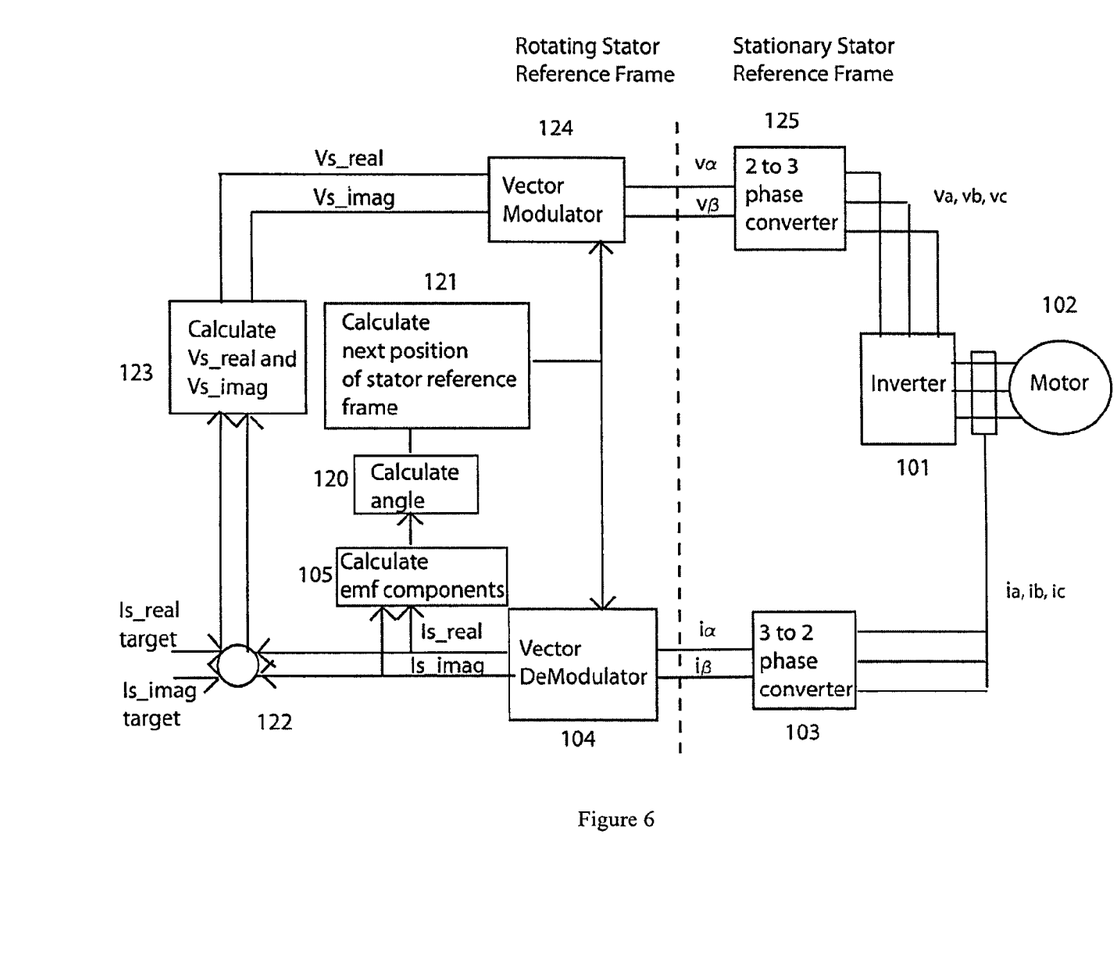
FIG. 6 shows a block diagram of a machine controller according to one embodiment of the invention.

FIG. 6 illustrates the implementation of the second embodiment as a control block diagram. A power electronic inverter 101 and motor or generator 102 is controlled according to this aspect of the invention. The currents to/from the motor 102 are monitored at a pre-determined interval of time or rotor angle using a detection means. The detection means may be current sensors within the motor or may be current sensors in the inverter. In a three phase motor it is possible to only measure two of the three phases as the three phase currents are known to add up to zero. Three phase currents can be transformed to two phase currents in the stationary stator reference frame by block 103. If the motor is a two phase motor such as a hybrid stepping motor this step 103 is not necessary.

A vector demodulation block 104 forms a first part of the calculating means and transforms the currents from the stationary stator reference frame to the rotating stator reference frame at a known angle to produce the real current vector component $I_{s\_real}$ aligned with the rotating stator reference frame and the imaginary current vector component $I_{s\_imag}$ orthogonal to the rotating stator reference frame.

A second block of the calculating means 105 uses these current components to estimate the components of the emf. A further block 120 implement equations 10, 17, 18 or 19 to calculate an estimate of the angle of the emf vector relative to the rotating stator reference frame. An error means determines an angular error signal between the estimated position of the emf vector and a desired position of the emf vector. The next position of the rotating reference frame is calculated in 121 which will be used by the synchronising means 124 to move the voltage vectors to a new position to bring the emf vector closer to the correct position with respect to the rotating stator reference frame at the next time step.

In this embodiment the error means also determines the errors in the real and imaginary current vectors relative to the target values (122). A controlling means (123) determines the real and imaginary voltage vectors to minimise the errors in the real and imaginary current vectors. These new voltage vectors are used with the new angular position calculated in 121 in the vector modulator block or synchronising means (124), to produce the voltage vectors $V_\alpha$ and $V_\beta$ in the stationary stator reference frame. For three phase motors these two stationary voltage vectors pass through a further 2 phase to 3 phase conversion 125 to drive the inverter 101 and motor 102 during the next time step.

The method of this invention is applicable to hybrid stepping motors which are commonly available with two, three and five phase windings. Both embodiments would be suitable for such motors with appropriate choice of blocks 103 and 125 to match the number of phase windings. The advantages of the ratiometric methods according to this invention are particularly useful to reduce the errors due to parameter variations. Furthermore the ability to calculate and update the vector positions in every pwm cycle is very important in the hybrid stepping motor since the electrical cycles are very short due to the high number of rotor poles. The methods according to this invention therefore make the control of these motors possible without position sensors.

Other brushless permanent magnet synchronous motors (both sinusoidal and trapezoidal types) can benefit from the method of the invention. Application of the invention to brushless permanent magnet synchronous motors has the following advantages over prior art sensorless control schemes for such motors. No knowledge of the motors rotational emf to speed characteristic is required and a reasonable estimate of the winding resistance is all that is required as the method is surprisingly tolerant to errors in this value. In brushless permanent magnet motors the reactance is usually smaller than the resistance and the method of the invention can be applied very successfully while completely ignoring the reactive voltage terms in Equations (7) and (8).

The flux switching machine is an electrical machine with a rotor with no magnets or windings and a stator carrying a field winding or permanent magnets and armature windings with any number of electrical armature phases, including one, two, three and five. As with all synchronous motors the armature rotational emf alternates at a frequency proportional to rotor speed. In flux switching machines with field windings in the stator, the magnitude of the rotational emf is dependent on both the speed of the rotor and the magnitude of the field current. Control of a flux switching motor according to this invention completely avoids the need to measure field current to establish the relationship between rotational emf and field current. The method according to this invention controls the armature current of each phase winding to be in phase with the emf in that phase winding without ever needing to know the magnitude of the emf. It does this by controlling the instantaneous angle of the voltage vector delivered to the machine to maintain the current in synchronism with the angle of the emf. The ratiometric calculations implemented in this invention therefore deliver a major breakthrough for the control of the flux switching motor without position sensors on the rotor. The simple rotor construction of the flux switching motor makes them suitable for high speed operation. At higher rotational speeds the reactance of the armature windings may be significantly higher than the resistance. Under these conditions the resistive terms in Equation (7) and (8) may be ignored. Further advantages in the calculation loop are obtained by the simplifications in the second embodiment of the invention.

The method according to this invention has been particularly beneficial for use on synchronous reluctance motors. In these motors the motor model is very complex and prior art sensorless techniques have been difficult to implement in a low cost microcontroller. The very simple method according to this invention will work, requiring only two parameters, winding resistance (though this does not need to be accurate)

and an inductance value, representative of the inductance of the phase windings when the rotor is in its peak torque position with respect to the stator winding. Refinements to the basic principles described by this invention may include making the inductance value a function of the peak current in the phase winding, thus representing the effect of magnetic saturation in the steel.

The two embodiments of the invention described have used the chosen position of the rotating reference frame to make one of the orthogonal components of the vectors equal to zero or to allow one of the orthogonal vectors to be controlled to zero. In the first embodiment the rotating reference frame was chosen to be in line with the voltage vector and it was not therefore necessary to have any orthogonal voltage vector. In the second embodiment the rotating reference frame position was chosen to closely follow the position of the rotational emf allowing the controller to minimise the angular position of the emf vector relative to this reference frame. It is clearly possible to implement the invention on any other reference frame by suitable adjustment of the equations and target values.

Operation of a machine in four quadrants (motoring/generating, clockwise/anti-clockwise) is achieved by correct choice of positive and negative signs for the main quantities. The description has described the invention, with the assumption that the vectors were rotating anti-clockwise. The actual motor direction will depend on the phase sequence in the machine. The direction of rotation of the vectors can be reversed so that the vectors rotate clockwise. It is beneficial to achieve this with a negative angular increment in the stator reference frame position (negative speed). The $\overline{E_s}$ vector is maintained as close as possible to the real axis but the value of $I_{s\_real}$ would be negative, making the current 180° out of phase with the real axis. In this way the torque calculated by equation (2) or (3) is negative. Negative torque maintains the negative speed to satisfy the requirements of a motor rotating in the third quadrant. If the estimated angular position of the emf vector is positive ($\theta_{Es}$>0) then the error is corrected by slowing down the negative angular increments in the stator reference frame (becomes less negative). The error is added to the negative angular speed to correct the error. This is the same sense of correction which was done in the positive direction. A machine can also be changed instantaneously from motoring to generating by reversing the direction of the $I_{s\_real}$ vector to create an instantaneous negative torque. The machine will then begin to slow down $\theta_{Es}$ will be monitored as being less than zero and the negative error in $E_s$ position will decrease the angular increments in the stator reference frame to ensure that the stator reference frame closely tracks the rotor position. The mathematical implementation of the scheme is therefore seamless between the four quadrants of operation.

Examples of synchronous machines which can be controlled according to this invention are shown in FIGS. 7, 8, 9 and 10.

Figure 7:
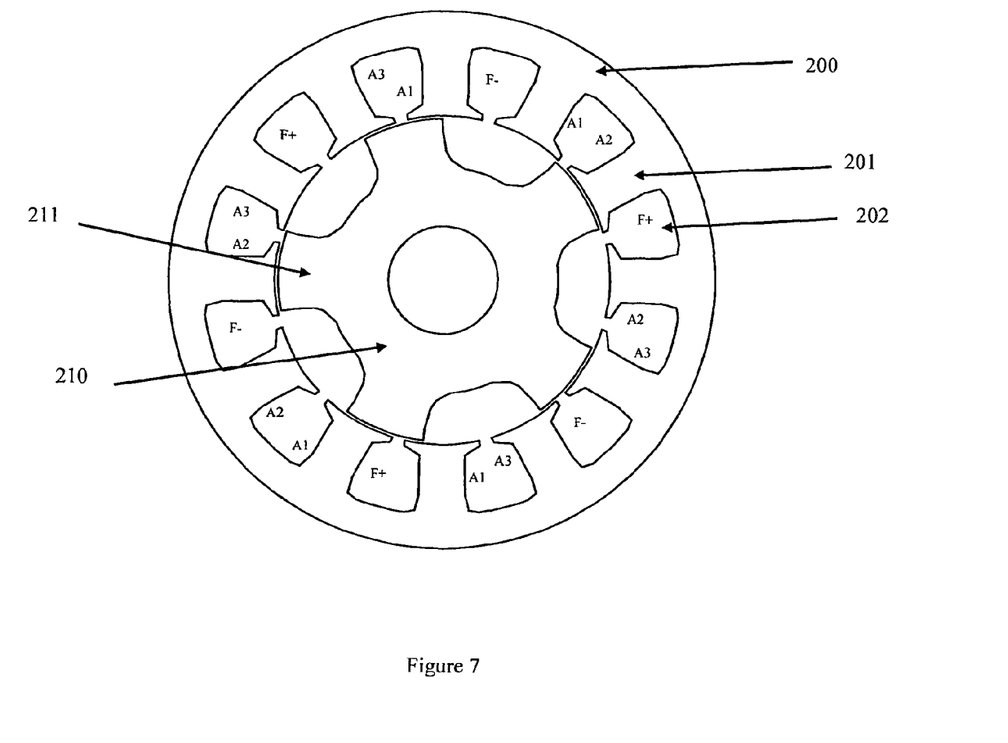
FIGS. 7, 8, 9 and 10 are sections through examples of machines to which the controller of the invention may be applied.

FIG. 7 shows a three phase flux switching machine. A stator 200 has 12 teeth 201 and 12 slots 202 between the teeth. The stator slots carry stator windings, Six of the slots carry field windings, each field slot carrying a current in the opposite direction to the next field slot, to create a six pole magnetic field. The other six slots carry three phase windings or armature windings, $A_1$, $A_2$ and $A_3$. The rotor 210 of the flux switching machine is made of laminated steel and carries no windings or permanent magnets. In this example the rotor has five teeth 211. With field current supplied to the field winding, rotation of the rotor within the stator induces three alternating voltages 120° apart. If the three armature phase windings are connected to a three phase inverter and armature currents are delivered to the windings in synchronism with the induced emf continuous motoring or generating is achieved.

Figure 8:
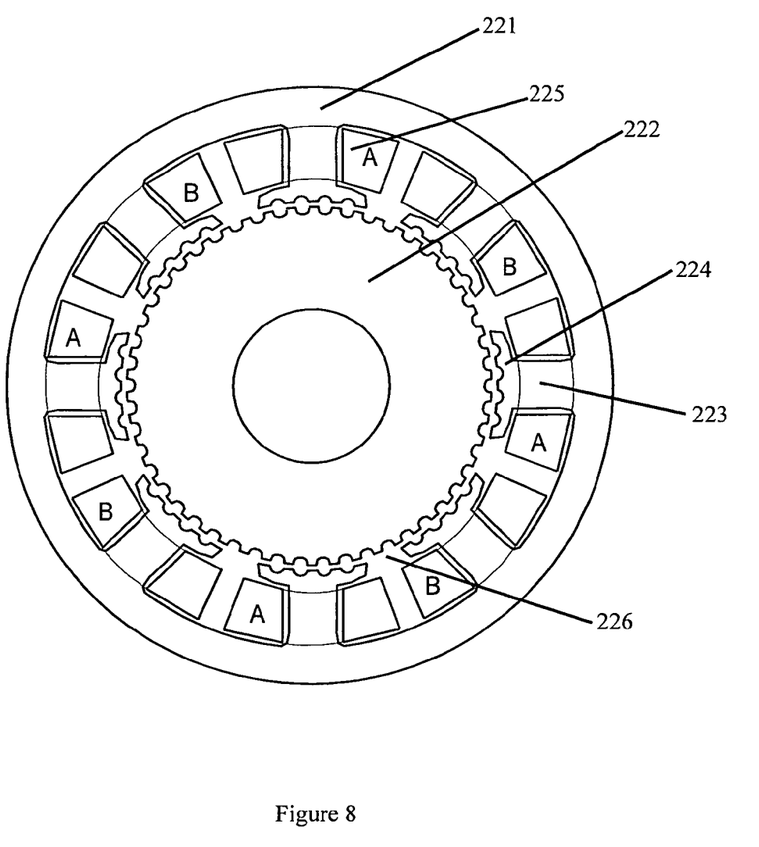

The hybrid stepping motor is a further example of a synchronous motor. Hybrid stepping motors usually have two, three or five phase windings. FIG. 8 illustrates a transverse cross-section through one end of a typical two-phase hybrid stepping motor.

The two-phase hybrid stepping motor of FIG. 8 consists of a stator 221 and a rotor 222, both of which are constructed from stacked laminations of electrical grade steel. The stator has eight poles 223, four for each phase, which widen at the tips to a group of teeth 224. Each stator pole 223 has a winding in the form of a short-pitched phase coil 225. These coils 225 are connected, usually in series, to form two electrically independent motor phase windings A and B. The rotor has a large number of radially spaced teeth 226 (typically 50) at each of its ends, and incorporates a permanent magnet which produces static flux along the axis of the machine. This makes the rotor teeth at one end of the machine all North poles and the rotor teeth at the other end of the rotor all south poles. The teeth 226 at one end of the rotor 222 are offset by half a tooth pitch with respect to the teeth 226 at the other end of the rotor 222. The rotor tooth pitch is the same as the tooth pitch of the stator 221. The emf induced in the two stator phase windings arises from the rotation of the rotor. The emf in phase A is 90° phase shifted from the emf in phase B.

Figure 9:
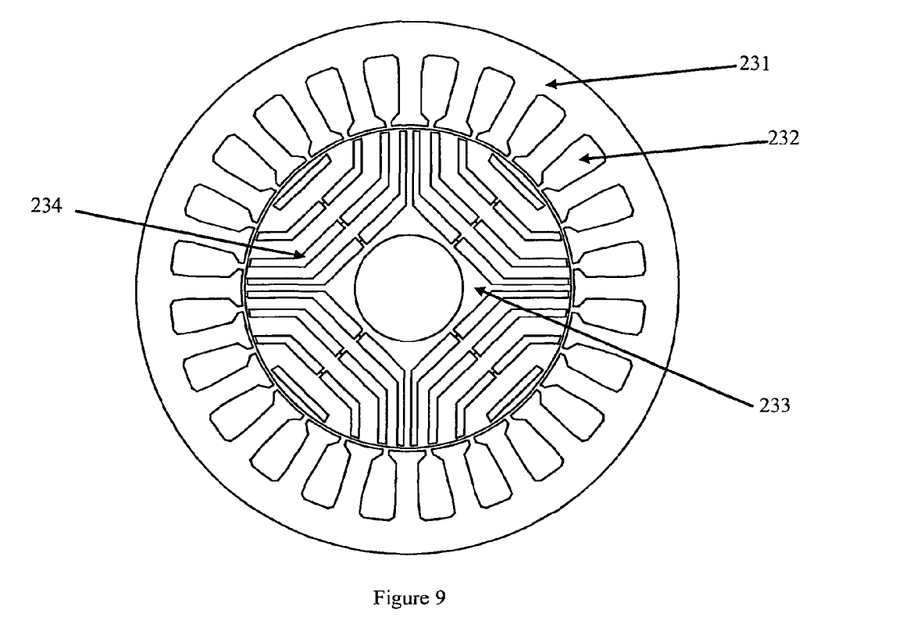

FIG. 9 shows a synchronous reluctance motor with stator 231 and rotor 233. The stator shown has 24 slots 232 though 12 and 36 are also common. The stator slots contain a distributed three phase winding. The rotor 233 is made from laminated steel and contains slotting to act as flux barriers. This creates axes of high and low reluctance such that if the stator winding creates a 4 pole magnetic field the rotor will align the flux barriers so that the stator flux follows a low reluctance path. As the stator field rotates the rotor will follow the field in synchronism. Many different rotor constructions can be used, the aim being to deliver the maximum ratio of reluctance variation. In this motor there is no rotating magnet to induce an emf in the stator windings; the torque is created by variations in the self inductances of the stator windings and variations in the mutual inductance between phase windings as the rotor rotates. Such a motor is known to be difficult to control and maintain in synchronism. The method according to this invention provides a solution to this problem. As an enhancement to the synchronous reluctance motor, permanent magnets can be inserted within the rotor slotting to increase the magnetic saliency further and increase torque production. Such a machine is known as an interior permanent magnet synchronous motor.

Figure 10:
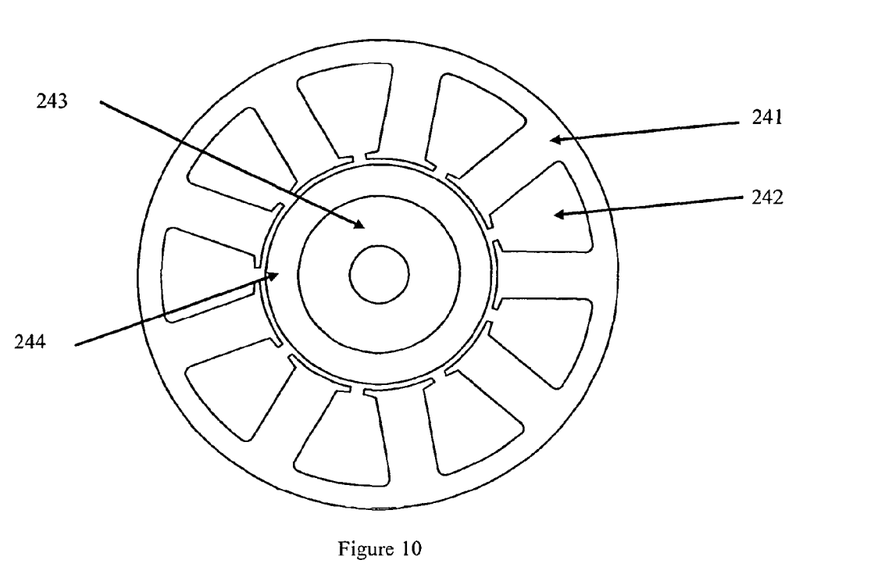

FIG. 10 is a more common permanent magnet synchronous motor. The stator 241 is again made from laminated steel. In this example the stator has 9 teeth interspersed between the 9 slots 242. The stator winding would typically be wound with a short pitch with one coil wound around each tooth and then the three coils spaced at 120° to each other connected together to create each of three phase windings. The rotor 243 has a steel core surrounded by a layer of permanent magnet material. In this example the permanent magnets are magnetised radially to create a six pole magnetic field. Rotation of the rotor induces three emfs in the stator windings which are displaced in phase by 120° (electrical degrees). Operation as a motor requires an inverter to deliver three alternating armature currents in synchronism with the internal emf induced in each winding.

Whilst these motors are very different in construction, they all have the requirement that to obtain optimum operation as a motor or a generator requires accurate control of the stator currents to maintain synchronism with the rotor position. This must be achieved over a wide range of speeds and loads and under dynamic conditions when the load or speed may change rapidly. Despite the very different operating principles of these motors, the method according to this invention has been proven to be suitable for the control of all of these machine types, with very efficient calculations times, allowing it to be implemented in a low cost microcontroller.

The invention claimed is:

1. A control system for an electrical machine comprising a rotor and a stator having one or more phase windings for generating a rotating stator magnetic field in a stationary reference frame relative to the stator, the system comprising:
   detection means for monitoring current in at least one of the phase windings;
   first calculating means for determining from the monitored current values representative of real and imaginary components ($I_{s\_real}$, $I_{s\_imag}$) of the current vector in a rotating reference frame rotating relative to the stationary reference frame;
   second calculating means for determining from the monitored current values representative of real and imaginary components ($E_{s\_real}$, $E_{s\_imag}$) of the emf vector rotating in the rotating reference frame, the second calculating means serving to determine the ratio of the real and imaginary components $E_{s\_real}$, $E_{s\_imag}$) of the emf vector;
   estimating means for estimating a value representative of an angular position of the rotating emf vector from said ratio;
   error means for determining an angular error signal indicative of the deviation of the estimated angular position from a desired angular position which is in line with the real axis of the rotating reference frame; and
   synchronising means for controlling the machine such that the angular error signal tends towards zero.

2. A control system according to claim 1, wherein the real component ($I_{s\_real}$) of the current vector is along a real axis at a known angle in line with the rotating reference frame and the imaginary component ($I_{s\_imag}$) of the current vector is orthogonal to the real component ($I_{s\_real}$).

3. A control system according to claim 1, wherein the real component ($E_{s\_real}$) of the emf vector is along a real axis at a known angle in line with the rotating reference frame and the imaginary component ($E_{s\_imag}$) of the emf vector is orthogonal to the real component ($E_{s\_real}$).

4. A control system according to claim 1, wherein the error means serves to determine a real current error between the real component ($I_{s\_real}$) of the current vector and a target value for the real current vector component and an imaginary current error between the imaginary component ($I_{s\_imag}$) of the current vector and a target value for the imaginary current vector component.

5. A control system according to claim 4, wherein a real voltage vector component ($V_{s\_real}$) is determined which minimises the real current error and an imaginary voltage vector component ($V_{s\_imag}$) is determined which minimises the imaginary current error.

6. A control system according to claim 5, wherein the synchronising means uses the error between the estimated angular position of the emf vector and the desired angular position of the emf vector to correct the angular position of the rotating reference frame and delivers the real voltage vector component ($V_{s\_real}$) and the imaginary voltage vector component ($V_{s\_imag}$) in line with the corrected angular position of the rotating reference frame.

7. A control system according to claim 6, wherein the value representative of the desired angular position is varied according to operating speed or load.

8. A control system according to claim 1, wherein the first calculating means serves to determine the ratio of the real and imaginary components ($I_{s\_real}$, $I_{s\_imag}$) of the current vector.

9. A control system according to claim 1, wherein the estimating means serves to estimate a value representative of an angular difference between the angle of the current vector and the angle of the emf vector by evaluating the difference between a function of the ratio of the orthogonal current vector components ($I_{s\_real}$, $I_{s\_imag}$) and a function of the ratio of the orthogonal emf vector components ($E_{s\_real}$, $E_{s\_imag}$).

10. A control system according to claim 9, wherein the error means serves to determine the error between the value representative of the angular difference and a value representative of a desired angular difference.

11. A control system according to claim 10, wherein the value representative of the desired angular difference is approximately zero.

12. A control system according to claim 9, wherein the synchronising means comprises means for controlling the stator voltage angle dependent on the angular error signal.

* * * * *